United States Patent [19]

Kimura et al.

[11] Patent Number: 5,676,762
[45] Date of Patent: *Oct. 14, 1997

[54] PROCESS FOR DISTRIBUTING ULTRA HIGH PURITY GASES WITH MINIMIZED CORROSION

[75] Inventors: Masao Kimura, Tsuchiura; Toshiyuki Tsukamoto, Ushiku; Kohei Tarutani, Tsukuba; Jean-Marie Friedt, Tokyo, all of Japan

[73] Assignee: L'Air Liquide, Paris, France

[ * ] Notice: The term of this patent shall not extend beyond the expiration date of Pat. No. 5,591,273.

[21] Appl. No.: 506,867

[22] Filed: Jul. 25, 1995

Related U.S. Application Data

[63] Continuation-in-part of Ser. No. 366,468, Dec. 30, 1994, Pat. No. 5,591,273.

[51] Int. Cl.$^6$ .............................. B08B 3/04; B08B 5/00; B08B 5/04; B08B 9/00
[52] U.S. Cl. .................. 134/21; 134/22.14; 134/22.18; 134/22.19; 134/25.4; 134/26; 134/30; 422/7; 422/14
[58] Field of Search .................. 134/21, 22.14, 134/22.18, 22.19, 25.4, 26, 30; 422/7, 14

[56] References Cited

U.S. PATENT DOCUMENTS

| | | | |
|---|---|---|---|
| 4,723,363 | 2/1988 | Seelbach et al. | 34/9 |
| 5,092,937 | 3/1992 | Ogura et al. | 134/30 |
| 5,330,652 | 7/1994 | Goldman et al. | 210/618 |

FOREIGN PATENT DOCUMENTS

| | | |
|---|---|---|
| 0 392 985 | 10/1990 | European Pat. Off. . |
| 5-140777 | 6/1993 | Japan . |

OTHER PUBLICATIONS

Tatenuma, K. et al. *Quick Acquisition of Clean Ultrahigh Vacuum by Chemical Process Technology*. Journal Of Vacuum Science And Technology. part A, vol. 11, No. 4, pp. 1719–1724. Jul. 1993.

"Analysis Of Trace Moisture In HCl By Gas–Phase FTIR", Keiji Miyazaki et al, Bull. Chem. Soc. Jpn. 66,969–971 (1993), Mar. 1993, vol. 66, No. 3, pp. 969–971.

"Quick Acquisition Of Clean Ultrahigh Vacuum By Chemical Process Technology", K. Tatenuma et al, J. Vac. Sci. Technol. A 11(4), Jul./Aug. 1993, pp. 1719–1724.

"Concepts In Competitive Microelectronics Manufacturing", Michael Liehr et al, J. Vac. Sci. Technol. B 12(4), Jul./Aug. 1994, pp. 2727–2740.

"Determination Of Trace Impurities In Corrosive Gases By Gas–Phase FTIR", Keiji Miyazaki et al, Bull. Chem. Soc. Jpn. 66,3508–3510 (1993), Nov. 1993, vol. 66, No. 11, pp. 3508–3510.

K. Tatenuma et al, Buneski 223, 393 (1994).

*Primary Examiner*—Zeinab El-Arini
*Attorney, Agent, or Firm*—Burns, Doane, Swecker & Mathis, L.L.P.

[57] ABSTRACT

A process for reducing corrosion in a gas distribution network of ultra high purity gas or any part of said distribution network, including:

(a) Wet cleaning the gas distribution network or at least one part thereof with a wet cleaning agent, (b) Liquid drying the gas distribution network or the at least one part thereof with an $H_2O$ desorbing liquid drying agent selected from the group consisting of acetone dimethylacetal DMP, 2.2 dichloropropane DCP or 2.2 dibromopropane DBP, mixtures thereof and any equivalent thereof, (c) purging said gas distribution network or any part thereof with a dry high purity gas comprising less than 1 ppm of any impurity, and (d) evacuating the gas distribution network or any part thereof at a pressure which is lower than $5 \times 10^4$ Pascal (e) exposing the gas distribution network or any part thereof to an atmosphere including an ultra high purity corrosive gas or air.

19 Claims, 5 Drawing Sheets

PROCESS FOR DISTRIBUTING ULTRA HIGH PURITY GASES WITH MINIMIZED CORROSION

CROSS-REFERENCE TO RELATED APPLICATION

This application is a continuation-in-part of U.S. Ser. No. 08/366,468, filed Dec. 30, 1994, now U.S. Pat. No. 5,591,273.

FIELD OF THE INVENTION

The present invention relates to the distribution of ultra high purity electronic specialty gases. More particularly, the present invention relates to the minimization of corrosion in the distribution of ultra high purity gases.

BACKGROUND OF THE INVENTION

The use of ultra high purity of chemicals, in particular of chemical gases, used in the processing of electronic materials is known to be a key factor in achieving acceptable production yield, production reproducibility and high quality in the manufacturing of electronic devices. For a recent review, see e.g., M. Liehr and G. W. Rubloff, J. Vac, Sci, Technol. B 12, 2727 (1994) which is hereby incorporated by reference.

Even if high purity is achieved at the manufacturing and purification step of such chemical gases, it is known that contamination occurs easily during their transportation to the point of use, through an equipment network (also referred to as a gas distribution network) which can include large lengths of tubing and many components for the control of pressure and flow rate (e.g. pressure reducers, valves, mass-flow controllers, filters, purifiers, etc.) which have to be interposed in a wafer fabrication between the source (e.g. gas cylinders) and the point of use (e.g. the process reactor) as well as other components well known to those of ordinary skill in the art.

The problem is of particular concern in the case of corrosive gases, such as halogen containing gases, which easily react with exposed surfaces including the communication surfaces of the gas distribution network through corrosion reactions. Such corrosion reactions may generate not only particulate contamination but also completely modify the adsorption-desorption properties of the gas and its impurities on the thus modified surface. Ultimately, corrosion phenomena may create leakage or malfunction of mobile parts, which will be of concern with respect to the safety efficiency and effectiveness of the gas distribution equipment.

Such corrosion reactions are known to be associated with the presence of moisture, even in minute quantities. Although state of the art corrosive gases are very pure with $H_2O$ concentration typically below 1 ppm (1 part per million) [See e.g. Miyazaki et al., Bull. Chem. Soc. Japan 66, 3508(1993); 66, 969(1993)], the corrosion reactions often take place by mechanisms involving the moisture adsorbed on the communication surface of a gas distribution network.

The current objective in purity of ultra clean electronic specialty gases to be delivered at point of use is in the range of 1 to 100 ppb (parts per billion) for any volatile impurity, particulate density lower that 1 particulate per cubic foot (under normal condition) and metal concentrations of less than 100 ppt (parts per trillion) for any metallic element present.

A major mechanism of microcontamination in the above considered purity range arises from the difficulty of completely removing adsorbed molecules from the surface of the materials exposed to the electronics specialty gases, and in particular of moisture, which is widespread in the environment and presents a particularly strong adsorption energy to surfaces.

Many of the corrosion electronic specialty gases, although of high purity, i.e., with less than 1 ppm $H_2O$ concentration, tend to react with such adsorbed molecules, particularly $H_2O$ adsorbed on metallic surfaces, though a catalytically activated chemical reaction, which promotes corrosion and the formation of volatile or solid by-products in the considered concentration range and also solid particulates.

The usual procedure carried out to clean such a gas distribution network is to flow ultra high purity inert gas (e.g. nitrogen or argon of purity better than 1 ppb) in order to purge all impurities present in the volume or at the communication surfaces of the gas distribution network. This procedure is nevertheless unsatisfactory for strongly adsorbed molecules, e.g. $H_2O$ molecules adsorbed on solid surfaces. Others have attempted to improve this purge procedure and reduce its duration by using successive pressure-vacuum cycles of the inert gas and also by heating the surface in order to induce thermal desorption of the strongly adsorbed molecular species. However, these vacuum-pressure purge cycles prove inefficient in locations representing deep deadspaces because of the inefficiency of pumping through minute orifices.

Still others have attempted thermal baking at 120° C. during the purge of metallic surfaces. Such a procedure is known to significantly reduce the time to reach the background level of the purge gas. For example, one can obtain 1 ppb purity in a few hours when flowing ultra high purity (<1 ppb impurity) nitrogen or argon at 0.1–10 standard liter per minute through a gas distribution network free of microleaks of a length between about 10 and about 200 meters, approximately. However, it is also known that the thermal desorption of $H_2O$ on an electropolished stainless steel surface occurs in several steps, the last one being at temperature of the order of 400°–450° C. Such a temperature is difficult to apply in practice. Hence, when lower baking temperatures are applied, e.g. frequently 120° C. for practical reasons, the metal surface is not entirely free of adsorbed moisture. Moreover, thermal baking cannot be applied in practice under some circumstances for safety, regulation or material stability reasons.

Others have attempted to improve the purge procedure of the gas distribution network, using for instance a larger number of vacuum-pressure cycles, or increasing the flow rates of the ultra high purity gases. Although this may decrease the initial concentration of the generated impurities and particulates, the time required to reach the background level is always quite long, i.e. about 40 minutes at 40 sccm flow rate and about 15 minutes at 30 sccm flow rate.

Others have used chemical-drying agents in the vapor phase such as DMP (acetone dimethyl acetal), DCP (2-2-di-chloropropane or DBP (di-bromopropane) as has been reported where they react with adsorbed moisture (K. Tatenuma et al., J. Vac. Sci. Technol. A11, 1719 (1993); K. Tatenuma et al., Bunseki 223, 393 (1994) or also as liquid mixed with fluorocarbon liquids (Kokai, 5-140777).

The wet cleaning removes molecular species soluble in these liquids or removes by dilution or liquid mechanical friction molecular species and particulates which may reside on the surfaces before the below described wet drying. Thus, wet cleaning of the gas communicating surfaces of the various components of the gas distribution network removes surface impurities (molecules or particulates).

Surface modifications induced by corrosion will affect the adsorption energy between the surface and both the Electronic Speciality Gas (ESG) and its impurity, hence resulting in a gas of fluctuating composition at the point of usage. Moreover, in the operation of such a gas distribution network, it is essential to prevent the intrusion of any moisture or air, or to be able to remove the resulting intruded molecules if this should happen.

It is therefore an object of the present invention to provide another technology to more effectively dry the surfaces, particularly for deep deadspace locations or those which cannot be heated for thermal desorption because of practical, hazardous or regulatory conditions.

It is also an object of the present invention to provide a process to remove adsorbed molecules, particularly $H_2O$, before introducing electronic specialty gases into a distribution network, in an effort to suppress the above-described source of corrosion and of microcontamination by volatile or particulate impurities.

It is a further object of the present invention to provide a process for minimizing corrosion in the distribution of ultra high purity gases.

It is further an object of the present invention to provide a process for the minimization of contaminants and particulates generated by corrosion in the distribution of ultra high purity gases.

It is further an object of the present invention to provide an apparatus for carrying out a process for minimizing corrosion in the distribution of ultra high purity gases.

SUMMARY OF THE INVENTION

The foregoing objectives are achieved by a process for reducing corrosion in a gas distribution network of ultra high purity gas or any part thereof, comprising:

(a) Wet cleaning the gas distribution network or at least one part thereof with a wet cleaning agent; and (b) Liquid drying said gas distribution network or said at least one part thereof with an $H_2O$ desorbing liquid drying agent selected from the group consisting of acetone dimethylacetal (equivalently called dimethoxy propane) (DMP), 2,2 dichloropropane DCP or 2,2 dibromopropane DBP, mixtures thereof and any equivalent thereof.

The foregoing objectives are also achieved by an apparatus for the delivery of ultra high purity gases including a means for liquid drying the gas distribution network or any part thereof with an $H_2O$ desorbing liquid drying agent.

DETAILED DESCRIPTION OF THE PREFERRED EMBODIMENTS

The process of the present invention includes:

(a) Wet cleaning the gas distribution network or at least one part thereof with a wet cleaning agent; and (b) Liquid drying said gas distribution network or said at least one part thereof with an $H_2O$ desorbing liquid drying agent selected from the group consisting of acetone dimethylacetal DMP, 2,2 dichloropropane DCP or 2,2 dibromopropane DBP, mixtures thereof and any equivalent thereof.

The present invention provides for the corrosion reduced distribution of ultra high purity gases based on the improved removal of moisture adsorbed on metal surfaces and other surfaces comprised.

The process of the present invention is particularly well suited for the problem of corrosion originating from a cylinder valve since thermal desorption of the species adsorbed in the cylinder valve is prevented by safety and regulation considerations.

The present invention includes wet cleaning at least a portion of a gas distribution network which is the most corrosion sensitive (such as valves), liquid drying of at least said portions of the gas communicating surfaces of the gas distribution network through exposure to an $H_2O$ desorbing liquid drying agent which reacts with adsorbed moisture and preferably leaves neither substantial particulate residues nor substantial volatile molecules adherent to the metal surface. The liquid drying of the present invention can be completed very effectively at room temperature using a liquid chemical which preferentially removes adsorbed $H_2O$ and which will leave neither particulate residue nor volatile molecules presenting strong interaction energy to the surface. The latter are hence easily purged out under vacuum-pressure cycles after the liquid drying step.

In one embodiment of the present invention such liquid drying agents include DMP (Acetone Dimethyl Acetal), DCP (2-2-Dichloropropane) or DBP (DiBromopropane). However, other $H_2O$ desorbing liquid drying agents known to those of ordinary skill in the art can be used in accordance with the present invention. It is most preferred to use pure liquids, in order to combine the wet cleaning and drying properties of these molecules.

Preferably thereafter, purging of any residual by-product is accomplished, preferably by pressure-vacuum cycle purge using ultra high purity inert gas, preferably dry and preferably containing less than 1 ppm of any impurity. Then an evacuation step is preferably carried out at a pressure which is preferably lower than $5 \times 10^4$ Pascal. The above procedure is done before exposing said surfaces to the electronic specialty gas, particularly the corrosive ones like HBr, or the like, or ambient air.

The wet-cleaning by a high purity liquid, e.g. DI water, alcohols, acetone or others, removes molecular species soluble in these liquids. It also removes by dilution or liquid mechanical friction molecular species and particulates which may accidentally reside on the gas communicating surfaces before the above described wet drying.

This step is particularly useful when the gas distribution network or any part thereof is accidentally exposed to air, e.g. during cylinder connection or opening the network for repair or component exchange, moisture will be adsorbed on the surfaces. The presence of adsorbed $H_2O$ will promote corrosion reactions. The detrimental effect of such accidental corrosions can be effectively substantially suppressed by the above-described combination of the wet cleaning step prior to the liquid drying step (with or without purging with high purity inert gas or with or without vacuum pressure cycles between wet cleaning and liquid drying).

In another embodiment of the present invention, the same wet cleaning and liquid drying procedure is preferably also applied just after purging the ESG from an exposed component and before exposing it, even very briefly, to air. This is done in order to suppress the unwanted corrosion which may arise by reaction between residual adsorbed ESG and $H_2O$ molecules, which will occur after air exposure. Indeed, such reactions between adsorbed species are again catalytically activated and promote surface reaction leading to corrosion, particulates and formation of unwanted surface molecules.

In yet another embodiment of the present invention, repeated cycles of wet cleaning and liquid drying are completed. This sequence is particularly effective before and after any exposure of a surface to an ESG, particularly when the surface has been exposed to air.

Among the many appropriate uses for the process of the present invention, particularly the combination of steps (a) and (b), it is intended for use before (a) any exposure (even for a minimal time) to air and (b) before flowing the ESG through the gas distribution network.

The present invention provides a procedure for corrosion reduced or free, i.e. volatile reaction by-products-reduced and particulates-reduced, electronic specialty gases distribution based on the improved removal of moisture adsorbed on metal surfaces and other surfaces. The process of the present invention is particularly well suited for the problem of corrosion originating from a cylinder valve since thermal desorption of the species adsorbed in the cylinder valve is prevented by safety and regulation considerations.

The process of the present invention may optionally first include purging said distribution network or any part thereof with a dry inert high purity gas comprising preferably less than 1 ppm of any impurity and more particularly less than 1 ppm water vapor. After purging and venting the purging gas, then the distribution network is usually evacuated to sub,ambient pressure. These two first steps may be repeated until a pressure of less than $5 \times 10^4$ Pascal is reached, with an impurity content in the gas vented which is similar to that of the inert gas injected to purge. These steps (repeated as many times as necessary) are known as "cycled pressure-vacuum" purging. After these two optional steps, the gas distribution network is wet cleaned and liquid dried as indicated hereabove. The wet cleaning is accomplished with a high purity liquid such as DI water, alcohols, acetone or other similar cleaning agents known to those of skill in the art. The wet cleaning agents used in this step of the process according to the invention shall be high purity cleaning agents suitable for cleaning metallic surfaces, particularly stainless steel surfaces. By high purity, it is meant cleaning agents which, when they are used pure (or in admixture with other cleaning agents or solvents) do not leave substantial solid residues on the treated surface, i.e. comprising less than 1 mg. of solid residue per liter and preferably less than $10^{-6}$ g of solid residue per liter.

Figure 1A:
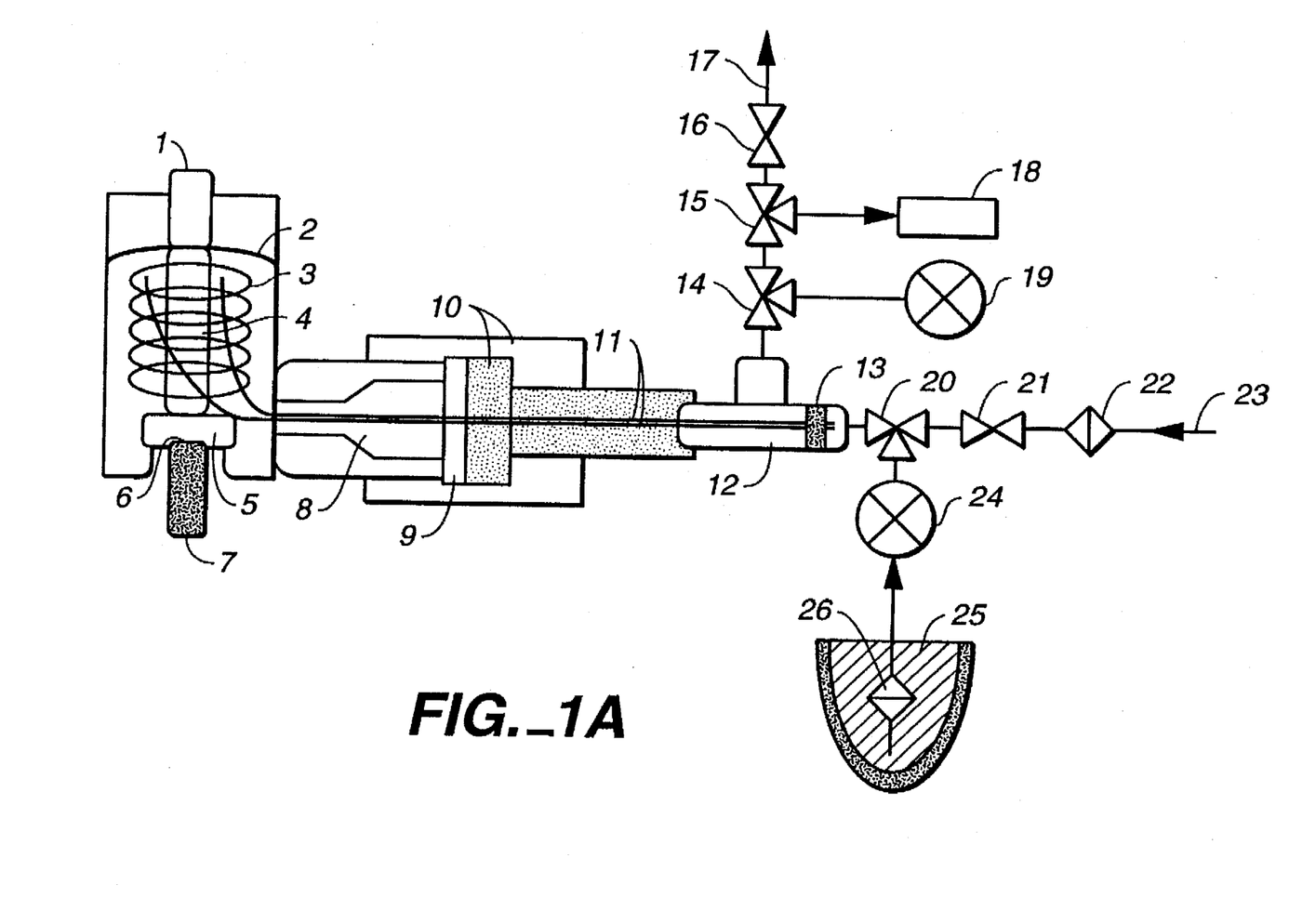
FIG. 1a and 1b illustrate two different apparatus for carrying out the process of the present invention.
Figure 1B:
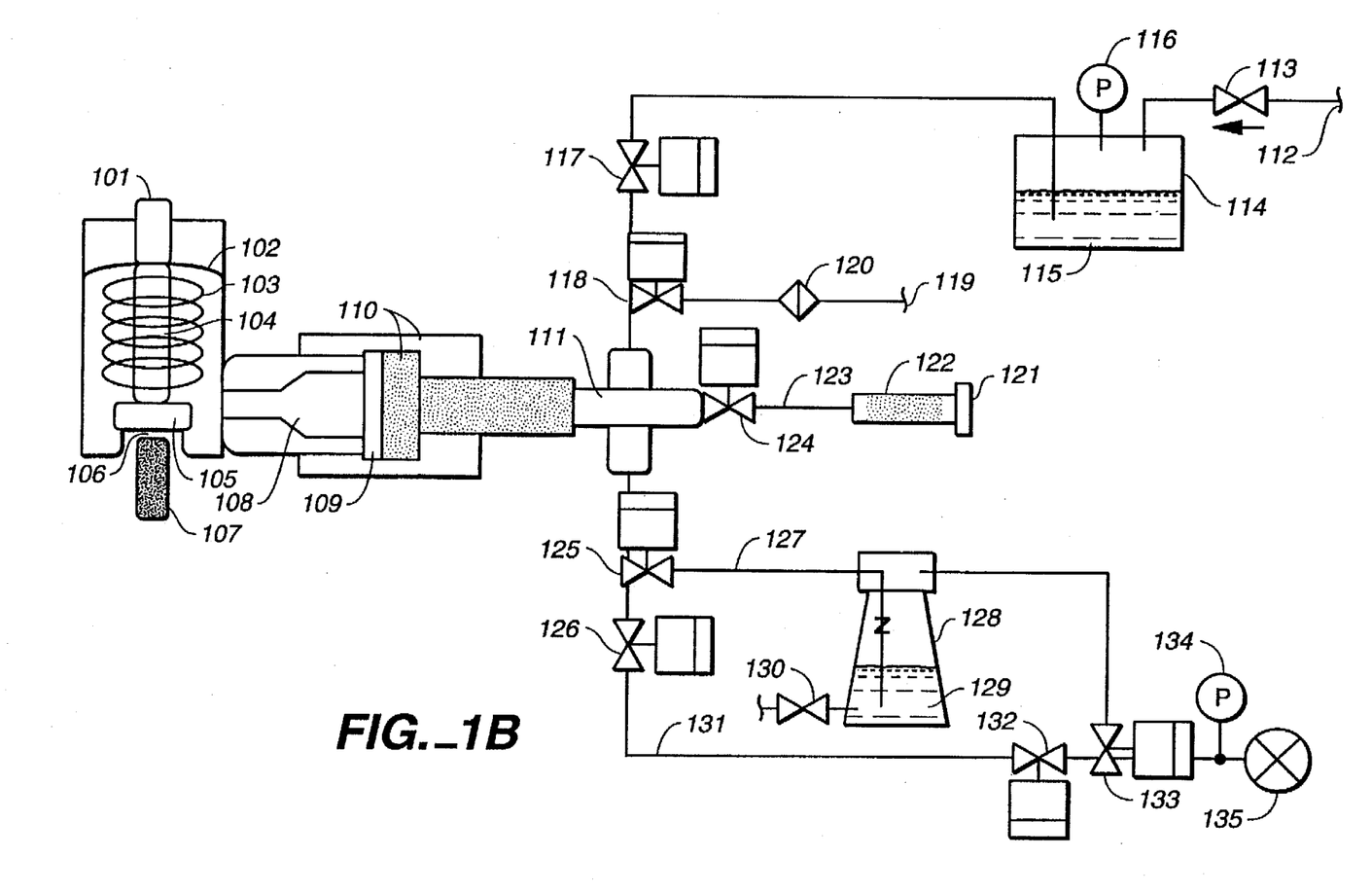

The injection of the wet cleaning (liquid) agent is made by any appropriate means such as disclosed hereafter with FIG. 1a and 1b. This injection can be done either manually with a syringe or automatically with a pump through capillary tubes.

The duration of this wet cleaning step is usually between about 1 min. to at most 1 hour. If the pipes and other components are new (i.e. have never been used before), it is usually not necessary to wet clean them. However, if it is believed that some particles or condensible molecules may have already adhered, wet cleaning during about 1 min. to about 2 min. is sufficient. If the pipe distribution network and/or other components of the network have already been used before, it is usually recommended to clean them between about 5 to about 30 min., preferably about 10 min.

Of course, this cleaning is applicable to pipings, valves, mass flow controllers and the like. As a new or existing gas distribution network, it is advisable to provide the process according to the invention each time, as an internal surface of the network shall be in contact with air. For example, when a cylinder is filled in a plant with an electronic specialty gas, it is recommended to clean/dry the valve as explained in the present specification at the end of the filling step. When the cylinder is delivered in the plant of the customer, it is also recommended to apply to said valve of said cylinder the process as disclosed in this specification particularly steps (a) and (b). Also, when the cylinder is withdrawn from the gas cabinet when it is empty, the same procedure should apply. Purging with inert gas between the wet cleaning step (a) and the liquid drying step (b) is usually optional.

The wet cleaning step (a) is then followed by a step comprising a liquid drying of the gas communicating surfaces of the gas distribution network through exposure to chemicals which react with adsorbed moisture and leave neither particulate residues nor volatile molecules adherent to the metal or other surface. This wet-drying step is intended to prevent any catalytic reaction of decomposition by water of the electronic specialty gases which flow through the distribution network. Liquid drying according to the present invention can be effectively completed at room temperature using a liquid chemical which preferably removes adsorbed $H_2O$ and which will leave neither particulate residue nor volatile residue (liquid/vapor) but being chemically active with adsorbed moisture. (No particulate residues means that the liquid contains usually less than 1 mg and preferably less than $10^{-6}$/g of particulate material per liter). These liquid chemicals are hence easily purged out under vacuum-pressure cycles after the liquid drying.

The duration of this liquid drying step is preferably between about 1 min. to about 20 minutes. Usually, if the device or piping distribution network is new and the roughness of the internal surface of the same is less than $5 \times 10^{-6}$ m (Ra<5×10–6 m), about 1 to about 2 minutes are usually enough. However, if the device, piping or network are not new and/or if the roughness of the surface Ra is greater than $5 \times 10^{-6}$ m, then it is usually recommended to treat with the drying agent during about 10 minutes or more.

According to the invention, the $H_2O$ desorbing liquid drying agent is selected from the group consisting of DMP (acetone dimethyl acetal), DCP (2-2-di-chloropropane) or DBP (2-2 dibromopropane), any mixture thereof and any equivalents thereof. An equivalent is herein defined as any liquid which can react with adsorbed moisture and leaves neither substantial particulate residues nor substantial volatile molecules adherent to the metal or other surface and which function is to prevent any catalytic reaction of decomposition by water of the electronic specialty gases which flow through the distribution network. It is most preferred to use pure liquids, in order to combine the wet-cleaning properties and chemical-drying properties of these molecules.

According to one aspect of the present invention, it has been unexpectedly discovered that the three above drying liquids (DMP, DCP or DBP), when used after the wet cleaning step disclosed hereabove, were extremely effective and that it cannot be accurately predicted whether other molecules of other H$_2$O desorbing liquid drying agent can be used as much successfully. However, it is well within the skills of the man skilled in the art to try another H$_2$O desorbing liquid to determine whether they are suitable or not.

Usually thereafter, purging of any residual by-product is accomplished preferably by pressure-vacuum cycle purge using ultra high purity inert gas, comprising preferably less than 1 ppm of any impurity.

In an especially preferred embodiment of the present invention, the gas distribution network is purged with an inert gas such as nitrogen, argon, helium or with a reductive gas such as hydrogen, after the wet cleaning and liquid drying steps have been completed and before the delivery of the ESG. The duration of purging may vary between about 1 minute to about 10 minutes, preferably between 2 to 5 minutes. The gas used for such purging has to be of course extremely pure, i.e. less than bout 100 ppb of volatile impurities and less than one particle per liter in normal conditions of temperature and pressure. (This purging with the above gases is usually carried out with alternate vacuum).

Next, an ESG is introduced into the gas distribution network. For the purpose of the present invention, an ESG means a corrosive gas or an electronic specialty gas which may have some corrosive properties or suspected corrosive properties. Also, of course, gas distribution network, or parts thereof which are essentially treated as disclosed hereabove, whether used to flow corrosive gas or any other gas (such as N$_2$). The present process essentially comprises the various treatment steps to reduce corrosion, whether or not a corrosive gas is further flown in the gas distribution network.

In another embodiment of the present invention, after flowing the ESG for the manufacturing process, such as I.C. manufacturing, the wet cleaning and the liquid drying steps (a) and (b) of the present invention are additionally performed just after purging the ESG from the distribution network and before exposing the network, even very briefly, to air. This reduces the occurrence of unwanted chemical reaction between residual adsorbed ESG and H$_2$O molecules, which will occur after air exposure. Indeed, such reactions between adsorbed species are again catalytically activated and promote surface reaction leading to corrosion.

In yet another embodiment of the present invention, two cycles or more of wet cleaning (e.g. the first using e.g. Di water—less volatile—the second using e.g. acetone or alcohol—more volatile) and at least one cycle of wet drying are completed. This sequence is particularly effective both before and after any exposure of a gas communicating surface of the gas distribution network to an ESG, particularly when the surface has been exposed to air.

Among the many appropriate uses for the process of the present invention, it is intended for use before (a) any exposure (even for a minimal time) to air and (b) before flowing the ESG through the gas distribution system or any part thereof.

The above process can be applied to a total gas distribution network. However, the most critical parts are those involving deep deadspaces such as found in a valve construction or other components such as mass flow controllers, pressure regulators, etc. Accordingly, the present invention is specially directed to such components in the gas distribution network.

A gas distribution network capable of carrying out the wet cleaning and/or liquid drying step of the present invention is rather intricate because of the deadspaces involved in a valve construction. Accordingly, the present invention is also directed to a gas distribution network capable of carrying out the process of the present invention with minimal deadspace.

An apparatus for carrying out the process of the present invention includes a means for wet cleaning the gas distribution network and a means for liquid drying the gas distribution network with an H$_2$O desorbing liquid agent.

According to one embodiment of the apparatus of the present invention, the wet cleaning and/or liquid drying agent can be introduced to the gas distribution network manually using a syringe type introduction system as represented on FIG. 1a and 1b.

In a preferred embodiment of the apparatus of the present invention, the circulation of the wet cleaning and/or liquid drying agents is achieved by the use of capillary tubing and includes the use of a circulation pump as a preferred method of operation as depicted in FIG. 1a. The apparatus of FIG. 1a provides a mechanically activated liquid circulation system designed to reach deep deadspaces within the components of the gas distribution network in implementing the process of the present invention. The system is based on a pump to provide liquid flow, capillary inlet and outlet lines to provide minute deadspaces and an assembly allowing clean fluid handling and minimal air exposure on connection and disconnection. The apparatus of FIG. 1a is further described below.

The cylinder valve head assembly of FIG. 1a includes a cylinder valve 1, diaphragm 2, spring 3, spindle 4, polymeric sealing material such as Diflon, Teflon or others 5, cylinder valve port 6, gas flow from cylinder 7 (for example HBr), outlet of cylinder valve 8, polymeric packing 9 and fitting and connector 10.

The cylinder valve head assembly is in fluid communication with a length of capillary tubing 11 and a first end of a "T" type male connector 12. A first end of a three-way diaphragm valve for wet cleaning and/or liquid drying inlet 20 is in fluid communication with a second end of the "T" type male connector 12. We use ceramic cement as a vacuum-tight, non-reactive and non-outgasing metal-metal bonding agent.

A liquid pump 24 is in fluid communication with a second end of the three-way diaphragm valve for wet cleaning and/or liquid drying inlet 20. Liquid pump 24 is further in fluid communication with a 0.1 μm filter 26 and wet cleaning agent or liquid drying agent 25.

A third end of the three-way diaphragm valve for wet cleaning and/or liquid drying inlet 20 is in fluid communication with diaphragm valve 21 which is in further communication with 0.1 μm filter 22 and dry gas inlet 23. Dry gas inlet 23 is used for the introduction of purge gases (inert or reductive, usually used between the cleaning step and the drying step).

A third end of the "T" type male connector 12 is in fluid communication sequentially with a three-way diaphragm valve for evacuation 14 by oil free vacuum pump 19, a three-way diaphragm valve 15 for moisture monitor by hygrometer 18, a diaphragm valve 16 and a vent line 17 for wet cleaning and/or liquid drying which is connected to recovering means (not shown in the drawing) to recover those products after being used.

In operation, the apparatus of FIG. 1a is operated as follows:

1. Close cylinder valve;
2. Open valve 16, close valve 14, 15, 20 and 21;
3. Insert capillary tubes into cylinder valve;
4. Connect apparatus to cylinder valve outlet (8) by the connector (10);

5. Open valve 20 and switch on the pump (24) (automatic) or a syringe (manual), and send cleaning liquid (25) to cylinder valve through capillary tubes;

6. Monitor the color or pH of vent liquid;

7. Continue to clean until vent liquid become colorless of pH7;

8. After cleaning, change the vessel filled with dry chemical agent, and introduce dry chemical agent into cylinder valve;

9. After introducing of dry chemical agent, switch off the pump (24) and close valve 20;

10. Open valve 21 and introduce dry gas and purge the line until no liquid is observed at vent line (17);

11. If very short dry-down time is necessary, close valve 16, 21, and open valve 14, and evacuate cylinder valve by vacuum pump (19);

12. Close valve 14 and open valve 16, 21, and purge cylinder valve by dry gas;

13. Open valve 15 and close valve 16, and monitor moisture concentration in dry gas by hygrometer;

14. Continue to dry down cylinder valve by moisture concentration of <1 ppm;

15. Disconnect the connector (10) of apparatus and introduce of small amount of dry agent into cylinder valve, then put blind cap for cylinder valve.

An alternative embodiment of the present invention, which has the advantages of easier connection and operation automatism, is described in FIG. 1b. Here, the valve and connector parts which are exposed to air under conventional operation conditions of a gas cylinder are evacuated using an oil-free pump. The liquid cleaning agent and liquid drying agent respectively are introduced as a jet driven by the difference of the pressures surrounding the liquids (atmospheric pressure) and the one residing inside the valve and its connector parts.

On FIG. 1b, the following references have the following meaning:

101 to 110 are similar to respectively 1 to 10.

111. Cross type male connector

112. Dry gas ($1.1-10 \times 10^5$ Pa) inlet

113. Check valve

114. High pressure vessel

115. Cleaning liquid

116. Pressure gauge

117. Pneumatic two-way valve

118. Pneumatic three-way valve

119. Dry gas ($1.1-10 \times 10^5$ Pa) inlet 120. 0.1 μm filter

121. Syringe

122. Dry chemical agent

123. Fine tube (inner diameter: 0.01–1 mm)

124. Pneumatic two-way valve

125. Pneumatic three-way valve

126. Pneumatic two-way valve

127. Exhaust line of used cleaning liquid

128. Liquid trap

129. Used cleaning liquid

130. Valve for discarding used cleaning liquid

131. Vacuum assisted $N_2$ cycle purge line

132. Pneumatic two-way valve

133. Pneumatic three-way valve

134. Vacuum gauge

135. Oil-free vacuum pump

The operation of this apparatus on FIG. 1b is as follows:
Wet-cleaning washing) process 1. Close cylinder valve 101.

2. Put cleaning liquid into the high pressure vessel (114) and close the cap.

3. Introduce high pressure ($1.1-10 \times 10^5$ Pa) dry gas in the remaining space in the high pressure vessel (114) and check the pressure by the gauge (116).

4. Put dry chemical agent (122) in syringe (121).

5. Close the valve 117, 118, 124, 125, 126, 132 and 133.

6. Connect apparatus to cylinder valve outlet (108) by the connector (110).

7. Switch on pump (135) and open valve 133 and 125 to evacuate cylinder valve.

8. Evacuate cylinder valve by vacuum gauge shows below $5 \times 10^4$ Pa, then close valve 125.

9. Open valve 117 and introduce pressurized ($1.1-10 \times 10^5$ Pa) cleaning liquid into cylinder valve.

10. After introducing cleaning liquid, close valve 117.

11. Maintain the cleaning liquid 0.01–15 min.

12. Open valve 125 and evacuate used cleaning liquid through the line (127) and evacuate cylinder valve (pump still running).

13. Evacuate cylinder valve until vacuum gauge shows below $5 \times 10^4$ Pa, then close valve 125.

14. Repeat valve evacuation-cleaning liquid filling cycle (steps 9–13) more than one time (until used cleaning liquid becomes colorless or ph7).

15. After cleaning, close valve 117, and stop supplying cleaning liquid.

16. Evacuate cylinder valve through the line (127).

17. After the evacuation of valve, close 125 and 133.
Wet-chemical drying process 18. After wet-cleaning, open valve 132 and 126 to evacuate cylinder valve.

19. After evacuation of cylinder valve, close valve 126.

20. Open the valve 118 and introduce dry gas of $1.1-10 \times 10^5$ Pa into cylinder valve.

21. After introducing dry gas, close valve 118.

22. Open valve 126 and evacuate cylinder valve until vacuum gauge shows below $5 \times 10^4$ Pa.

23. Repeat evacuation-dry gas filling cycle (steps 19–12) 1–10 times to remove remaining cleaning liquid in cylinder valve.

24. After above repeated cycle, close valve 118 and open valve 126 to evacuate cylinder valve.

25. After evacuation of cylinder valve, close valve 126.

26. Open valve 124 and introduce dry chemical agent (122) into cylinder valve through fine tube (123).

27. Keep filling dry chemical agent (122) in cylinder valve for 0.01–10 min.

28. Open valve 126 and evacuate cylinder valve until vacuum gauge shows below $5 \times 10^4$ Pa.

29. Close valve 126.

30. Repeat evacuation-dry chemical agent filling cycle (steps 25–28) several (2–20) times to remove moisture in cylinder valve.

31. After above repeated cycle, close valve 124 and open valve 126 to evacuate cylinder valve.

32. After evacuation of cylinder valve, close valve 126.

33. Open valve 118 and introduce dry gas of $1.1-10 \times 10^5$ Pa into cylinder valve.

34. After introducing dry gas, close valve 118.

35. Open valve 126 and evacuate cylinder valve until vacuum gauge shows below $5 \times 10^4$ Pa.

36. Repeat evacuation-dry gas filling cycle (steps 32–35) more than 10 times to remove moisture and hydrocarbons in cylinder valve.

37. Repeat above cycle by moisture concentration of <1 ppm and hydrocarbon concentration of <100 ppb.

38. After above impurities reach the level, disconnect the connector (110) of apparatus with dry gas blowing from exit of connector (110) with opening valve 118, then put blind cap immediately.

Accordingly, the present invention provides a process for reducing corrosion in a gas distribution network of ultra high purity gas with minimized contamination and particulates. This process includes the use of a wet cleaning agent and a liquid drying the distribution network with a drying agent, to substantially remove the $H_2O$ adsorbed to the gas communication surfaces of the gas distribution system as well as volatile and other impurities present in the network. The removal of adsorbed $H_2O$ reduces undesirable reactions with the specialty gases that result in the generation of particulates, contaminants and corrosion.

Thereafter, the distribution network is purged with a dry gas having preferably a purity better than 1 ppm of each of any impurity, then it is evacuated and then exposed to either the ultra high purity corrosive gas or air, or both. The present invention thus provides an improved delivery of ultra high purity gases at the point of use, with minimized corrosion.

In order to further illustrate the present invention and the advantages thereof, the following specific examples are given, it being understood that same are intended only as illustrative and in nowise limitative.

EXAMPLE 1

As an example of the present invention, HBr from a gas cylinder through a cylinder valve was analyzed.

Figure 2:
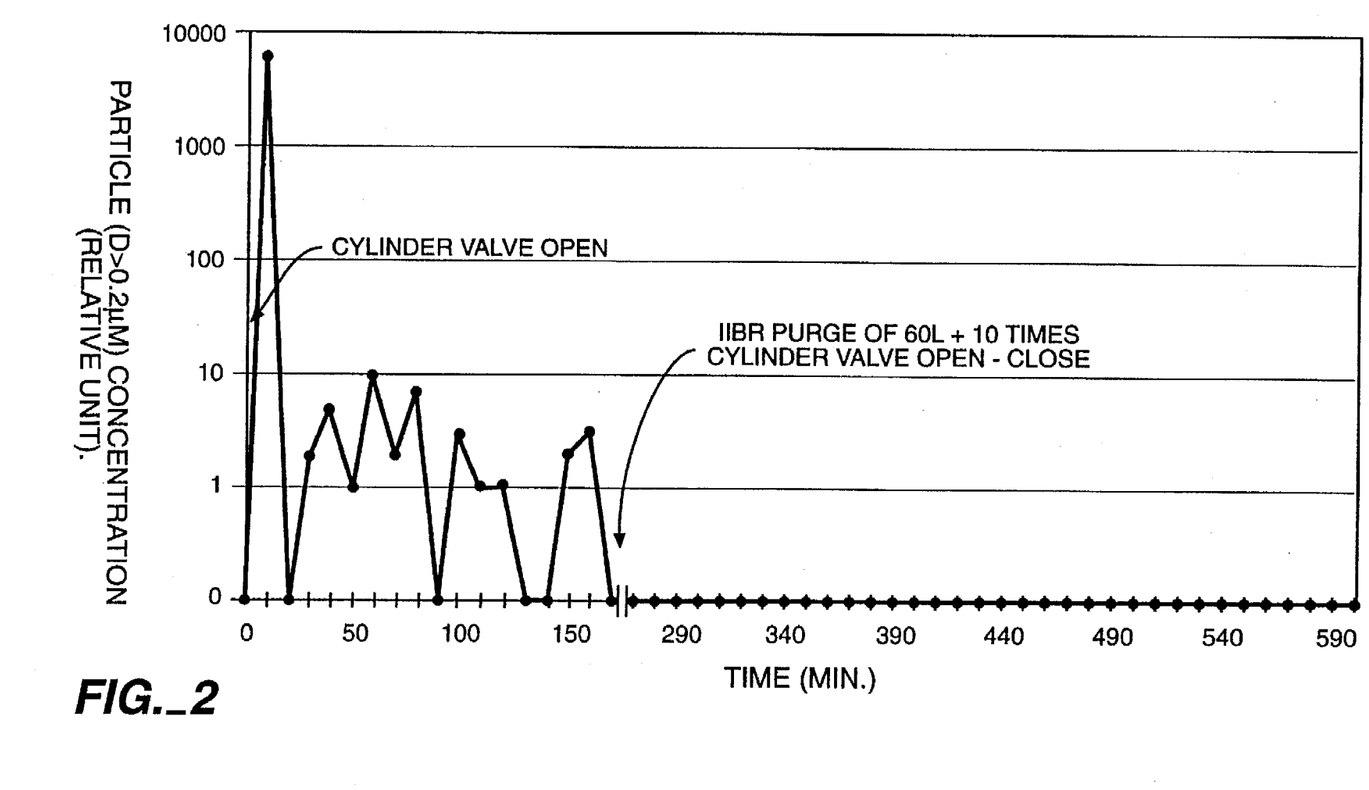
FIG. 2 is a graph that depicts particulates emitted from a gas cylinder through a cylinder valve.

Under conventional operating conditions using vacuum cycle purging, when the gas flows through a cylinder valve port and a short metal tubing for sampling, a very large particle count rate is observed as described in FIG. 2. Also, the metallic surfaces of both the valve port and the tubing are visibly corroded, via formation of green or reddish superficial product growth. Chemical analysis reveals the formation of superficial iron-bromide hydrates. The above behavior is believed to be related to the presence of adsorbed moisture on the metallic parts exposed to air, which reacts with HBr to generate above corrosion and impurities in particulate form.

Improving the purge procedure of the line, using for instance a larger number of vacuum-pressure cycles, or increasing the HBr flow rate or flowing duration, decreases the extent of corrosion and the concentration of generated particulates as depicted in FIG. 2.

Figure 3:
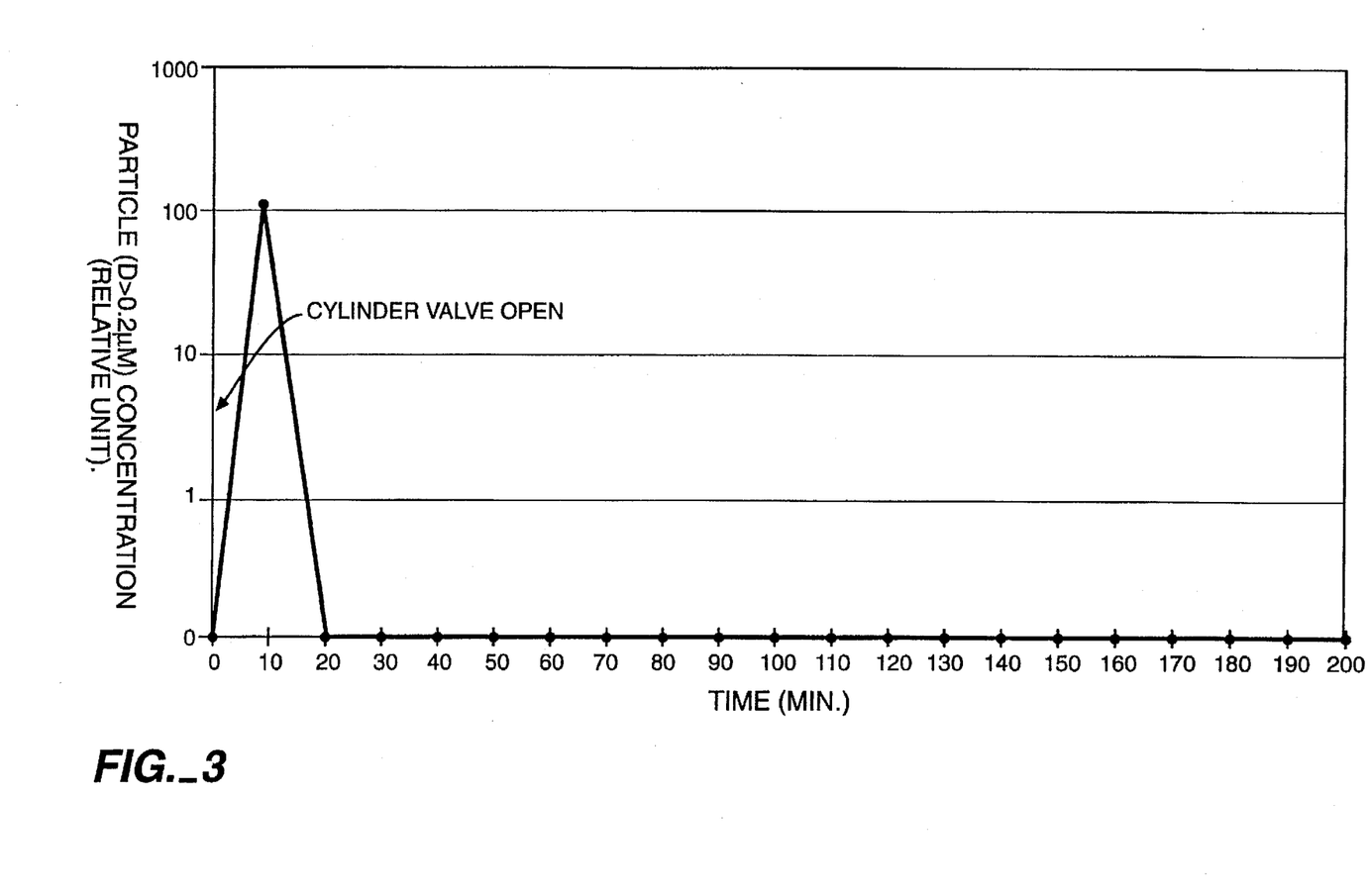
FIG. 3 is a graph that depicts particulates emitted from a gas cylinder through a cylinder valve which has been liquid dried according to the present invention.
Figure 4:
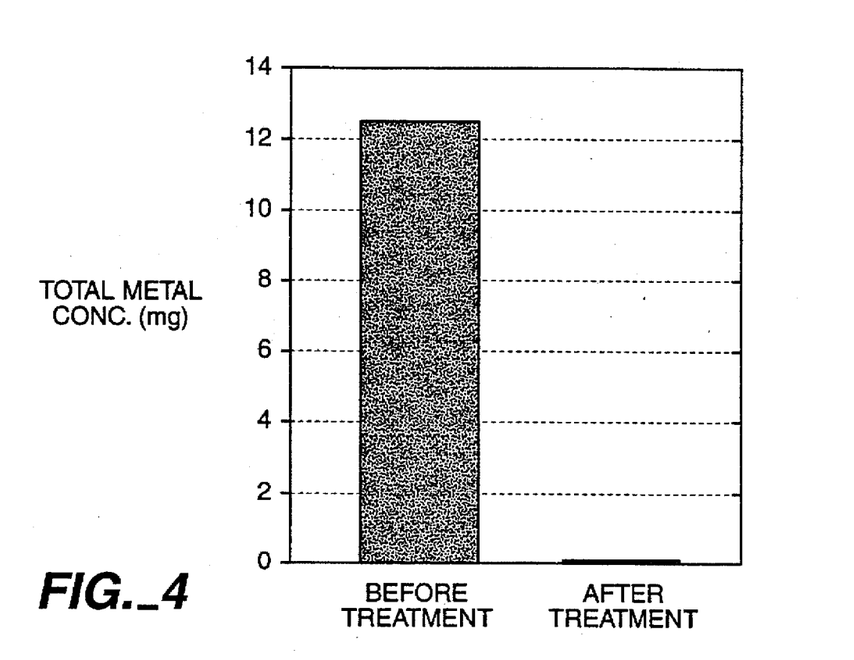
FIG. 4 is a comparative graph that depicts total metals leached on DI water of the HBr cylinder valve before and after the liquid drying of the present invention.

In contrast, using the process of the present invention including wet cleaning with a wet cleaning agent at least inside of the valve and its outlet part, e.g. with DI water, or acetone or IPA, then liquid drying with an $H_2O$ desorbing liquid drying agents, and then vacuum-purging of the residual gases after liquid drying, allows for essentially total absence of surface corrosion as well as the delivery of a contamination reduced and particulate reduced gas very shortly after the valve opening as depicted on the graph of FIGS. 3 and 4.

EXAMPLE 2

The extent of corrosion of the cylinder valve can be measured precisely by applying a leaching methodology using DI water followed by chemical analysis of the rinsing solution. (Hattori et al., Jpn. J. Appl. Phys. 33, 2100 (1994) hereby incorporated by reference. The metal concentration in the leaching solution of constant volume is proportional to the extent of corrosion, i.e. of the volume of soluble corrosion products.

It is found by this method that high corrosion occurs when a valve has been used conventionally, i.e. flowing HBr gas after vacuum cycle purging of the cylinder connection when said cylinder valve was exposed to ambient atmosphere. However, when applying the process according to the invention, i.e. preliminary wet cleaning by DI water or IPA followed by liquid drying with an $H_2O$ adsorbing liquid drying agent, corrosion on air exposure is essentially negligible and undetectable as depicted in the graph of FIG. 4.

EXAMPLE 3

Another commonly used corrosive gas is Dichlorosilane (DCS). A valve wherein DCS is flown after exposure of the valve to air and cylinder connection followed by vacuum cycle purging is very significantly corroded, as revealed by the metal leaching test (FIG. 5).

Figure 5:
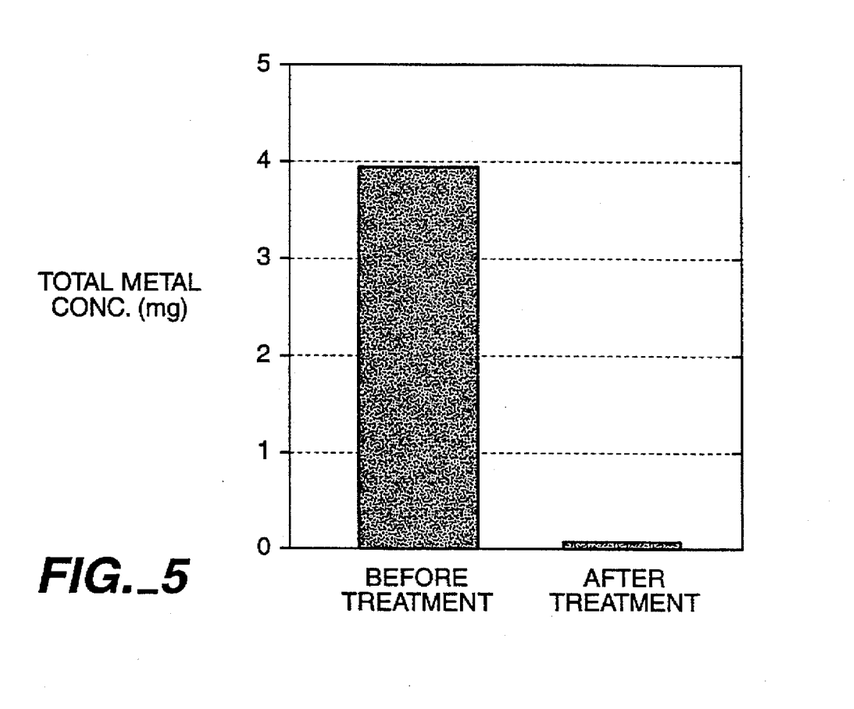
FIG. 5 is a comparative graph that depicts total metals leached on DI water rinsing of the DCS cylinder valve before and after the liquid drying of the present invention.

In contrast, if it is used with the invention, i.e. preliminary wet cleaning by DI Water or IPA followed by liquid drying with an $H_2O$ removing liquid drying agent and then flowing DCS for the same amount of time as above, corrosion is essentially undetectable (FIG. 5).

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A process for reducing corrosion in a gas distribution network of ultra high purity gas or any part of said distribution network, comprising the steps of:
   (a) Wet cleaning the gas distribution network or at least one part thereof with a wet cleaning agent;
   (b) Liquid drying said gas distribution network or said at least one part thereof with $H_2O$ desorbing liquid drying agent selected from the group consisting of acetone dimethylacetal, 2,2 dichloropropane or 2,2 dibromopropane, mixtures thereof or any equivalent thereof;
   (c) Purging said gas distribution network or any said part thereof with a dry high purity gas comprising less than 1 ppm of any impurity;
   (d) Evacuating said gas distribution network or any said part thereof at a pressure which is lower than $5 \times 10^4$ Pascal; and
   (e) Exposing said gas distribution network or said any part thereof to an atmosphere comprising an ultra high purity corrosive gas or air.

2. The process according to claim 1, wherein a step of wet cleaning is carried out for about 1 min. to about 1 hour.

3. The process according to claim 2, using a distribution network of ultra high purity gas comprising essentially components or parts thereof which have never been used before, wherein a wet cleaning step is carried out for about 1 min. to about 2 min.

4. The process according to claim 2, using a distribution network of ultra high purity gas comprising essentially components or parts thereof which have been used at least once before, wherein a wet cleaning step is carried out for about 5 to 30 minutes.

5. The process according to claim 1, wherein a step (b) of liquid drying is carried out for about 1 min. to 20 min.

6. The process according to claim 5, using a distribution network of ultra high purity gas comprising essentially components or parts thereof which have never been used before and having a roughness for their internal surface Ra which is lower than $5 \times 10^{-6}$ m, wherein a liquid drying step is carried out for about 1 to about 2 minutes.

7. The process according to claim 5, using a distribution network of ultra high purity gas comprising essentially components or parts thereof which have been used at least once before wherein a liquid drying step is carried out for about 10 minutes or more.

8. The process according to claim 5, using a distribution network of ultra high purity gas comprising essentially components or arts thereof which have a roughness of their internal surface Ra which is higher than $5 \times 10^{-6}$ m, wherein a liquid drying step is carried out for about 10 min. or more.

9. The process according to claim 1, wherein said wet cleaning agent is a liquid comprising less than 1 mg. per liter of particulate material.

10. The process according to claim 1, wherein said wet cleaning agent is a liquid comprising less than $10^{-6}$ g. per liter of particulate material.

11. The process according to claim 1, wherein said wet cleaning agent is selected from the group comprising deionized water, isopropyl alcohol, acetone or mixture thereof.

12. The process according to claim 1, further comprising repeating said steps (a) and (b) before carrying out said step (c).

13. The process according to claim 1, further comprising purging the gas distribution network or any part thereof with an inert or reductive gas between said steps (d) and (e).

14. The process according to claim 13, wherein said inert or reductive gas is selected from a group comprising nitrogen, argon, helium or hydrogen.

15. The process according to claim 14, wherein said inert or reductive gas comprises less than 100 ppb of volatile impurities and less than 1 particle per liter under standard conditions of temperature and pressure.

16. The process according to claim 13, wherein said inert or reductive gas comprises less than 100 ppb of volatile impurities and less than 1 particle per liter under standard conditions of temperature and pressure.

17. The process for distributing ultra high purity gases of claim 1, wherein said gas distribution network includes at least one cylinder valve.

18. The process according to claim 17, wherein said cylinder valve is submitted at least to step (a) and (b) before and after each contact of its internal surface with ambient air.

19. The process according to claim 1, further comprising, during step (e), purging the gas distribution network or any part thereof with a high purity inert gas before exposing to ambient air the said gas distribution network or any part thereof.

\* \* \* \* \*

UNITED STATES PATENT AND TRADEMARK OFFICE
CERTIFICATE OF CORRECTION

PATENT NO. : 5,676,762
DATED : OCT. 14, 1997
INVENTOR(S) : KIMURA ET AL.

It is certified that error appears in the above-identified patent and that said Letters Patent is hereby corrected as shown below:

In claim 8, line 3, please remove the word "arts" and insert therefor the word --parts--.

Signed and Sealed this

Third Day of March, 1998

Attest:

BRUCE LEHMAN

Attesting Officer

Commissioner of Patents and Trademarks